United States Patent
Pels et al.

[11] Patent Number: 6,085,723
[45] Date of Patent: Jul. 11, 2000

[54] APPARATUS AND METHODS FOR CONTROLLING IDLING SPEED OF AN INTERNAL COMBUSTION ENGINE BY REDUCING TORQUE FLUCTUATIONS

[75] Inventors: Thomas Pels, Achern; Klaus Revermann, Schwerinsdorf; Klaus-Peter Zeyen, Köln, all of Germany

[73] Assignee: ISAD Electronic Systems GmbH & Co. KG, Cologne, Germany

[21] Appl. No.: 09/389,546

[22] Filed: Sep. 3, 1999

Related U.S. Application Data

[63] Continuation of application No. PCT/EP98/01300, Mar. 6, 1998.

[30] Foreign Application Priority Data

Mar. 6, 1997 [DE] Germany .......................... 197 09 134

[51] Int. Cl.⁷ .............................. F02B 75/06; F02D 41/16
[52] U.S. Cl. ................................ 123/339.22; 123/192.1; 123/339.24
[58] Field of Search .............................. 123/192.1, 192.2, 123/339.1, 339.22, 339.24, 406.24, 406.25, 436; 290/40 A; 701/111

[56] References Cited

U.S. PATENT DOCUMENTS

| | | | |
|---|---|---|---|
| 4,699,097 | 10/1987 | Tanaka et al. | 123/192.1 |
| 4,922,869 | 5/1990 | Kadomukai et al. | 123/192.1 |
| 4,982,707 | 1/1991 | Maeda et al. | 123/192.2 |
| 5,020,491 | 6/1991 | Mashino | 123/192.1 |
| 5,056,487 | 10/1991 | Yamakado et al. | 123/436 |
| 5,087,869 | 2/1992 | Kuriyama et al. | 123/192.2 X |
| 5,105,776 | 4/1992 | Tsuchiya et al. | 123/192.1 |
| 5,109,815 | 5/1992 | Maeda et al. | 123/192.1 |
| 5,111,784 | 5/1992 | Kuriyama et al. | 123/192.1 |
| 5,245,966 | 9/1993 | Zhang et al. | 123/339.19 |
| 5,921,149 | 7/1999 | Masberg et al. | 74/574 |

FOREIGN PATENT DOCUMENTS

| | | |
|---|---|---|
| 42 13 589 A1 | 11/1992 | Germany . |
| 44 23 577 A1 | 8/1995 | Germany . |
| 60-006039 | 1/1985 | Japan . |
| 61-016247 | 1/1986 | Japan . |
| 2 213 292 | 8/1989 | United Kingdom . |
| WO 97/08435 | 3/1997 | WIPO . |

OTHER PUBLICATIONS

*Kraftfahrtechnisches Taschenbuch/Bosch* (named "Automotive Hanbook/Bosch" in the introductory part of the description), 21st edition, 1991, p. 435, (with abstract).

*Primary Examiner*—Tony M. Argenbright
*Attorney, Agent, or Firm*—Marshall, O'Toole, Gerstein, Murray & Borun

[57] ABSTRACT

Apparatus and methods are disclosed for controlling the idling speed of an internal combustion engine by reducing torque fluctuations experienced by the engine. In the disclosed apparatus, an electric machine is coupled to the drive shaft of an internal combustion engine. The electric machine is controlled such that it applies a varying torque substantially in counterphase to the torque fluctuations to reduce such fluctuations. The amplitude of the torque variations applied by the electric machine in the cold state of the internal combustion engine are greater than in the warm state. An idle control system functions to maintain the reference idling speed of the internal combustion engine in the cold state below or at the same level set in the warm state. The reference idling speed can be reduced relative to the idling speeds set in prior art systems to achieve enhanced engine performance.

21 Claims, 4 Drawing Sheets

APPARATUS AND METHODS FOR CONTROLLING IDLING SPEED OF AN INTERNAL COMBUSTION ENGINE BY REDUCING TORQUE FLUCTUATIONS

RELATED APPLICATION

This application is a continuation of International Patent Application Serial No. PCT/EP98/01300 filed Mar. 6, 1998.

FIELD OF THE INVENTION

The invention relates generally to drive systems, and, more particularly, to apparatus and methods for controlling the idling speed of an internal combustion engine by reducing torque fluctuations in the internal combustion engine.

BACKGROUND OF THE INVENTION

When in the idling state, an internal combustion engine that functions as a drive unit of a vehicle does not serve to drive the vehicle. Instead, it need only perform the work required to drive its own rotation and, possibly, the additional work required to drive mechanical or electrical auxiliary units (e.g., pumps, servo drives and/or a generator) which may be present and in an "on" state.

To keep fuel consumption, pollutant emissions and noise development low, the idling speed of the engine is generally set as low as possible. For reasons of comfort, however, the idling speed can only be reduced to a certain minimum speed. In the prior art, an idling speed control system maintains the idling speed of the engine as constant as possible at a value just above this minimum speed.

The minimum speed is temperature-dependent. In the cold state of the internal combustion engine (e.g., at start-up), the minimum speed lies higher than it does at, for example, the ordinary operating temperature. This change in the minimum speed is particularly pronounced at low, sub-freezing temperatures (for example, minus 20° C.). To address this temperature dependency, some prior art idle control systems ensure an acceptable idling speed is achieved at all temperatures by using the same average target idling speed at all temperatures of the engine, but uniformly raising the average target idling speed of the engine so that it lies just above the minimum idling speed required at the lowest expected temperature. This approach is disadvantageous, however, because the average target idling speed (and, thus, the actual idling speed) is needlessly high during all operating states except during the short starting phases at the lowest expected temperature.

Some prior art systems address this problem by controlling the idling speed reference value (i.e., the average target idling speed) as a function of temperature such that the idling speed of the internal combustion engine is raised at low temperatures. Prior art systems initially performed this idling speed adjustment through manual control, but for some time now, automatic idling speed control employing a temperature-dependent idling speed reference value has been commonly performed (see, for example, Automotive Handbook/Bosch, 21st Edition, 1991, page 435).

The above noted solution, which has been common for decades, functions, in principle, and is considered the optimal solution with respect to fuel consumption, pollutant emissions and noise development, given the close positioning of the idling speed reference value to the minimum speed at all temperatures that occur in practice.

An example of active damping of torque irregularities by means of an electric machine is known from DE 44 23 557 A1 (there a sector machine).

SUMMARY OF THE INVENTION

In accordance with an aspect of the invention, an apparatus is disclosed for use with a vehicle having an internal combustion engine that exhibits torque fluctuations during idling. The internal combustion engine has a cold temperature state. The apparatus includes at least one electric machine coupled to the internal combustion engine for applying a torque with a varying amplitude to the internal combustion engine to reduce the torque fluctuations. The amplitude of the torque applied to the internal combustion engine by the electric machine is greater when the internal combustion engine is in the cold temperature state than when the internal combustion engine is in the warm temperature state. The apparatus also includes an idle control system for setting an average target idling speed for the internal combustion engine. The idle control system sets the average target idling speed at a first level when the internal combustion engine is in the warm temperature state and at a second temperature level when the internal combustion engine is in the cold state, the second level being the same or lower than the first level.

In accordance with another aspect of the invention, a method of controlling the idling speed of an internal combustion engine is disclosed. The method includes the steps of: measuring a temperature associated with the internal combustion engine; reading at least one expected torque fluctuation value associated with the measured temperature from a torque fluctuation database; and employing the at least one expected torque fluctuation value to control an electric machine coupled to the internal combustion engine to apply a varying torque to the internal combustion engine to thereby reduce torque fluctuations associated with the internal combustion engine. It also includes the steps of setting a first average target idling speed for the internal combustion engine when the measured temperature indicates that the internal combustion engine is in a warm state; and setting a second average target idling speed when the measured temperature indicates that the internal combustion engine is in a cold state. The second average target idling speed is the same as or lower than the first average target idling speed.

In some embodiments, the method also includes the steps of: (a) measuring the torque fluctuation experienced by the internal combustion engine; (b) comparing the measured torque fluctuation to a predetermined value; (c) if the measured torque value exceeds the predetermined value, determining a new expected torque fluctuation value; and (d) employing at least one of the new expected torque fluctuation value and a value derived from the new expected torque fluctuation instead of the at least one expected torque fluctuation value read from the database to control the electric machine coupled to the internal combustion engine to apply a varying torque to the internal combustion engine to thereby reduce torque fluctuations associated with the internal combustion engine.

In accordance with another aspect of the invention, an apparatus is provided for use with a vehicle having an internal combustion engine that exhibits torque fluctuations during idling. The internal combustion engine has a drive shaft, a cold state and a warm state. The apparatus includes a temperature sensor positioned to detect a temperature associated with the internal combustion engine. It also includes a rotational position sensor located to sense an angular position of the drive shaft. Additionally, the apparatus is provided with an electric machine operatively coupled to the drive shaft for applying a torque thereto; and a memory storing a torque fluctuation database associating expected torque fluctuation values with temperatures. Moreover, the apparatus includes a control circuit in communication with the temperature sensor, the rotational position sensor, the electric machine and the memory. The control circuit retrieves an expected torque fluctuation value associated with a measured temperature from the memory and controls the electric machine to produce a varying torque which is at least initially based on the retrieved expected torque fluctuation value to thereby reduce the torque fluctuations of the internal combustion engine. The control circuit is also adapted to set an average target idling speed for the internal combustion engine that is independent of the sensed temperature.

In accordance with still another aspect of the invention, a method is provided for controlling the idling speed of an internal combustion engine. The method comprises the steps of: controlling an electric machine coupled to the internal combustion engine to apply a varying torque having a first amplitude to the internal combustion engine when the internal combustion engine is in a cold temperature state to thereby reduce torque fluctuations associated with the internal combustion engine; and controlling an electric machine coupled to the internal combustion engine to apply a varying torque having a second amplitude to the internal combustion engine when the internal combustion engine is in a warm temperature state to thereby reduce torque fluctuations associated with the internal combustion engine. The first amplitude is greater than the second amplitude. The method also includes the steps of: setting a first average target idling speed for the internal combustion engine when the internal combustion engine is in a warm state; and setting a second average target idling speed when the internal combustion engine is in a cold state. The second average target idling speed is the same or lower than the first average target idling speed.

Other features and advantages are inherent in the disclosed apparatus or will become apparent to those skilled in the art from the following detailed description and its accompanying drawings.

DESCRIPTION OF THE PREFERRED EMBODIMENTS

Figure 1:
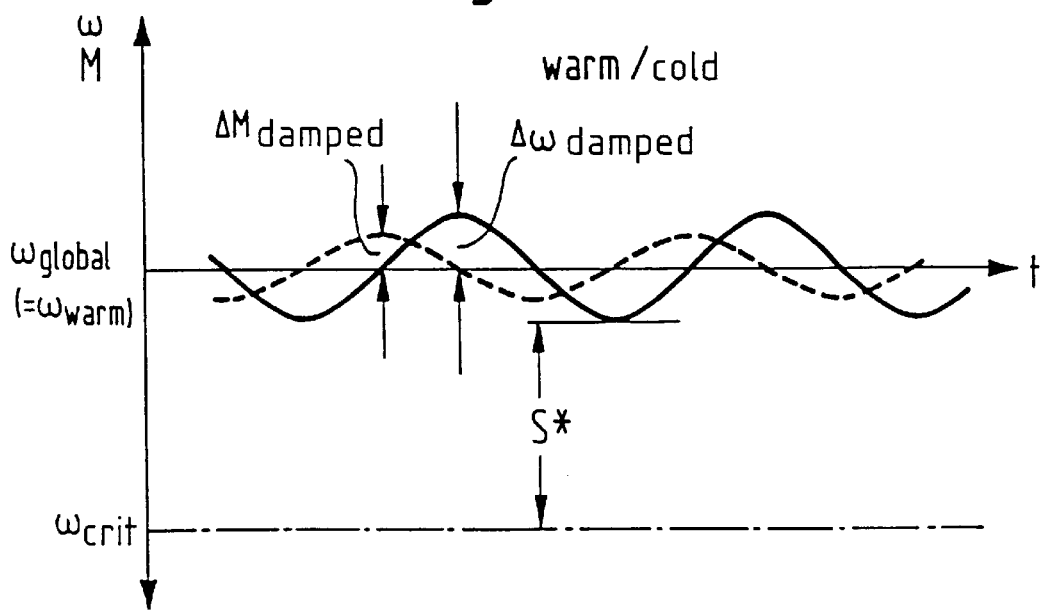
FIG. 1 is a graph illustrating exemplary damped variations in engine torque and the associated idling speed variations of an internal combustion engine employing the teachings of the invention and idling at both an operating temperature (warm state) and a lower temperature (cold state).

As used herein, the term "control" is understood in a broad sense, which generically embraces "open loop control" (i.e., influencing a quantity in an open effect chain) and "regulation or closed loop control" (i.e., influencing a quantity based on a comparison with another predefined quantity). The same understanding applies to terms derived from the term "control" such as "to control", "control device", etc.

The following findings underlie the invention. In a reciprocating internal combustion engine, the gas forces caused by combustion and the inertial forces caused by masses moving back and forth produce torque fluctuations that manifest themselves in torque non-uniformities around the average idling speed. These fluctuations occur essentially periodically as harmonics to the crankshaft rotation. For example, the gas and inertial forces in a 4-cylinder in-line engine lead to a torque fluctuation having a basic oscillation which corresponds to twice the rotational frequency (for example, the basic oscillation at an idling speed of 600 rpm (10 rotations per second) has a frequency of 20 Hz). In a cold engine (e.g., one being started), the frictional resistance to be overcome is generally greater because of the higher viscosity of the engine oil. To overcome this greater frictional resistance, the engine must produce more power and, for this purpose, receives a larger amount of fuel mixture. This again causes an increase in gas forces (the inertial forces depending only upon the speed remaining unaffected by this increase, as long as the speed is not changed).

There is generally a speed in an internal combustion engine (not to be confused with the aforementioned minimum speed) that should not be fallen short of even briefly, in order to ensure that the engine does not run haltingly or even stop. This speed is referred to herein as the critical speed. The average (i.e., averaged over torque fluctuations) target idling speed is chosen so that the smallest occurring speed value resulting from the torque fluctuations lies with a certain safety margin above the critical speed. (The average target idling speed so chosen corresponds to the minimum speed discussed above.) In the prior art, the average target idling speed must be raised by an amount corresponding to the increase in amplitude of the torque fluctuations in the cold state, so as to ensure the critical speed plus the safety margin is not breached.

For clarification, a common, prior art idle control system is initially described with reference to FIG. 5. As mentioned above, a reciprocating internal combustion engine exhibits speed fluctuations at the ordinary operating temperature around an average idling speed $\omega_{warm}$. These speed fluctuations generally have a complicated trend curve as a function of time. This curve is essentially periodic and has a small nonperiodic fraction (ignored here). For simplification, a sinusoidal curve is assumed below. The amplitude of the speed fluctuations has the value $\Delta\omega_{warm}$ at the operating temperature.

The speed fluctuations are caused, at least in part, by the torque fluctuations $\Delta M$ of the internal combustion engine. The phase of the torque fluctuations $\Delta M$ advances between 0° and 90° (shown with a dashed line). An advance of 90° is shown in the figures for clarity of representation. The internal combustion engine has a so-called critical speed $\omega_{crit}$, which must not be fallen short of, even briefly. To achieve a situation in which the smallest occurring speed lies at a safety margin S above the critical speed $\omega_{crit}$, the average idling speed $\omega_{warm}$ is set at the following value: $\omega_{warm}=\omega_{crit}+\Delta\omega_{warm}$. Typical values for these factors are: $\omega_{crit}$=600 rpm, S=50 rpm, $\Delta\omega_{warm}$=100 rpm, from which it follows: $\omega_{warm}$=750 rpm.

Figure 5:
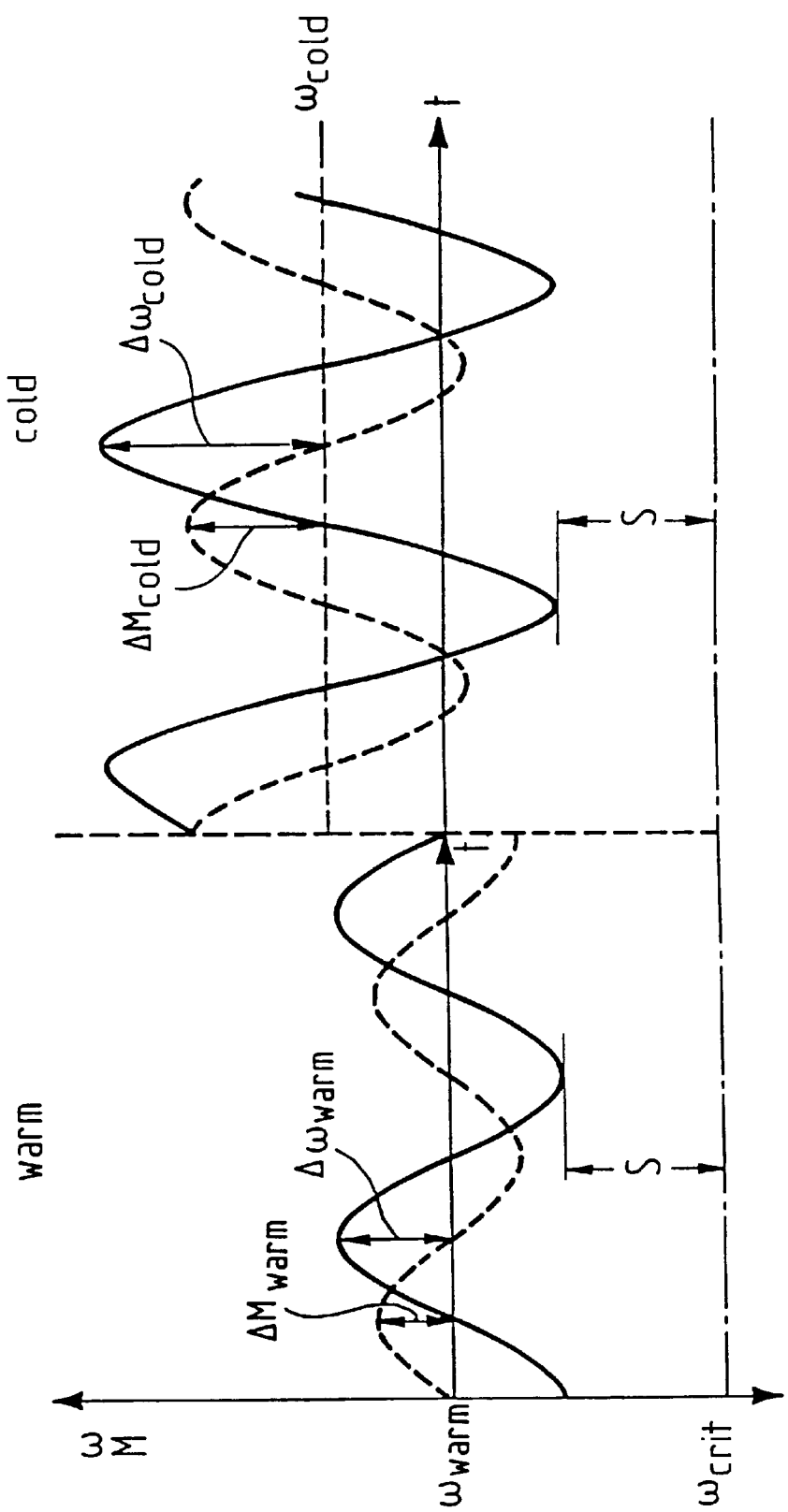
FIG. 5 is a graph similar to FIG. 1, but illustrating the engine torque and idling speed variations of an internal combustion engine employing ordinary idle control in both a cold state and a warm state.

At low temperatures, (for example, at −20° C.), the speed fluctuation amplitude is increased to a value $\Delta\omega_{cold}$ (see FIG. 5). Therefore, in order for the smallest occurring speed to lie above the critical speed by the same safety margin S when the engine is cold as it does when the engine is warmed to the operating temperature, the average idling speed in the prior art is increased by the amount of the increase in speed fluctuation amplitude, (i.e., by $\Delta\omega_{cold}-\Delta\omega_{warm}$). Typical values for these factors are: $\Delta\omega_{cold}$ = 250 rpm, $\Delta\omega_{cold}-\Delta\omega_{warm}$=150 rpm, from which it follows: $\omega_{cold}$ =900 rpm.

A graph illustrating exemplary idling speed fluctuations of an apparatus constructed in accordance with the teachings of the invention is shown in FIG. 1. In the example of FIG. 1, the torque fluctuations are actively damped. At cold temperatures, damping is increased in proportion to the increase in torque fluctuations and, thus, in proportion to the greater fluctuation in the idling speed amplitude experienced there such that an equally large speed fluctuation remains at both the operating temperature and the low temperature. In the depicted example, the amplitude of the damped idling speed fluctuation $\Delta\omega_{damped}$ is half the amplitude of the undamped speed fluctuation at the operating temperature $\Delta\omega_{warm}$. In other variants (not shown), the applied damping is stronger such that, for example, only 25% or less of the undamped amplitude $\Delta\omega_{warm}$ remains (for example, less than 20%, 15%, 10%). Because of the reduction in amplitude, an increased safety margin S* is present if the average target idling speed (now designated $\omega_{global}$) is unaltered from the example of FIG. 5. For example, if the amplitude of the idling speed fluctuation is damped by 50%, the remaining amplitude $\Delta\omega_{damped}$ is 50 rpm (i.e., 50% of $\Delta\omega_{warm}$ in the example given above). Accordingly, the safety margin is increased to S*=100 rpm.

Figure 2:
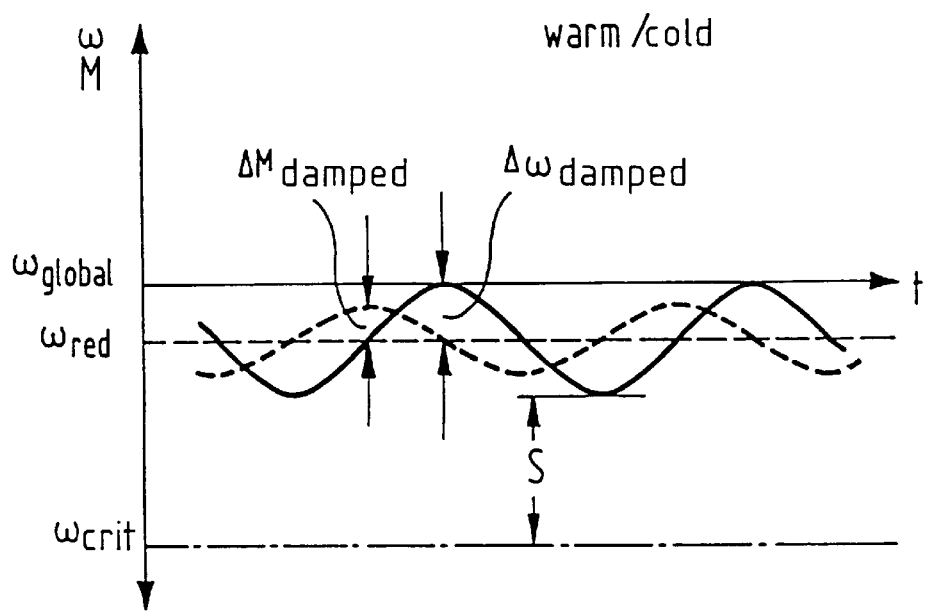
FIG. 2 is a graph similar to FIG. 1, but illustrating the engine torque and idling speed variations in an engine where the average target idling speed has been reduced.

Although the engine can be operated with the increased safety margin S* without departing from the scope or spirit of the invention, in the example of FIG. 2 the safety margin is reduced to the smallest necessary value S by performing an overall reduction of the average target idling speed to a reduced value $\omega_{red}$. The amount of reduction of the average target idling speed corresponds to the amount of the amplitude reduction achieved by the active damping. Therefore, if, as in the above example, the amplitude of the speed fluctuation is reduced by 50% from 100 rpm to 50 rpm, the average idling speed is reduced from 750 rpm to 700 rpm.

Although in the example of FIG. 2 active damping is performed in both the cold and warm states so that the average target idling speed (and, thus, the actual average idling speed) can be reduced across all temperatures, persons of ordinary skill in the art will readily appreciate that active torque fluctuation damping can be restricted to cold temperatures without departing from the scope or spirit of the invention. Under such an approach, when the engine is operated at the operating temperature, a torque fluctuation curve and an idling speed fluctuation curve corresponding to the curves shown in the part of FIG. 5 labeled "warm" are obtained. On the other hand, in the cold state the torque fluctuations are actively damped to the values occurring at the operating temperature. As a result, the torque fluctuation and idling speed fluctuation curves shown in the part of FIG. 5 labeled "warm" are again obtained.

Figure 3:
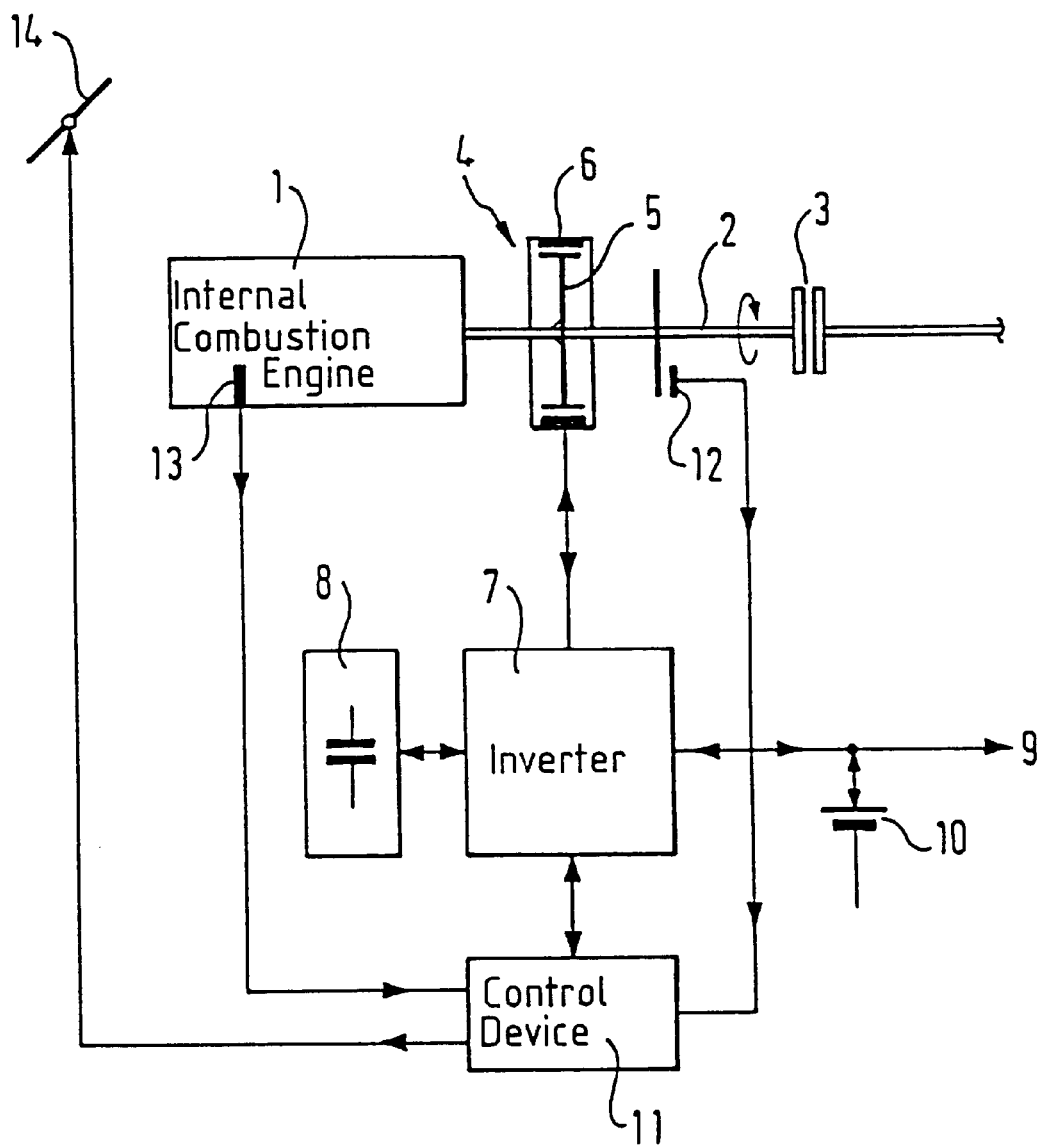
FIG. 3 is a schematic illustration of an apparatus constructed in accordance with the teachings of the instant invention.

An apparatus constructed in accordance with the teachings of the invention is shown in FIG. 3 in a preferred environment of use, namely, on a vehicle such as a passenger car driven by an internal combustion engine 1. In the example of FIG. 3, the internal combustion engine 1 releases torque to the drive wheels of the vehicle via a driveshaft 2 (for example, the crankshaft of the internal combustion engine 1), via a clutch 3 and via additional (not shown) parts of the drive train. In the idling operation of interest here, the clutch 3 is open. An electric machine 4 is located concentrically on the driveshaft 2. In the illustrated example, the electric machine 4 is implemented by an asynchronous three-phase machine. It has a rotor 5 sitting directly on the driveshaft 2 and connected to rotate in unison therewith. It also has a stator 6 supported on the housing of the internal combustion engine 1.

The stator winding (not shown) is supplied with electrical currents and voltages of almost freely adjustable amplitude, phase and frequency by an inverter 7. The inverter 7 may be implemented by, for example, a DC, intermediate circuit inverter. The inverter cuts out width-modulated pulses from an intermediate circuit DC voltage which is kept constant by means of electronic switches (e.g., field effect transistors or IGBT's). When averaged by the inductance of the electric machine 4, the pulses lead to almost sinusoidal currents of the desired frequency, amplitude and phase.

The inverter 7 is connected to both a rapid energy accumulator 8, (e.g., a capacitor accumulator) and a vehicle electrical system 9 which includes a vehicle battery 10. When the electric machine 4 functions as a generator and delivers power, the inverter 7 supplies this power (after rectification) to the rapid accumulator 8 and/or the vehicle electrical system 9, depending on whether the energy is to be stored briefly and/or fed to the electrical system 9 and/or battery 10. On the other hand, when the electric machine 4 functions as a motor, it receives its electrical power requirements via inverter 7 from the rapid accumulator 8 and/or the battery 10.

A control device 11 controls the inverter 7 and, by control of the inverter 7, the electric machine 4. The control device 11 receives input signals from a rotation angle sensor 12 from which it determines the instantaneous speed of the driveshaft 2. It also receives input signals from a temperature sensor 13. The signals from the temperature sensor carry information concerning the coolant temperature of the internal combustion engine 1. In the illustrated example, the control device 11 also assumes idling speed control of the internal combustion engine 1 and, for this purpose, controls the fuel feed to the engine via an adjustment device, (e.g., by means of a throttle valve 14) associated with the internal combustion engine 1. The idling speed may also be controlled by the controller 11 via the ignition unit (e.g., by adjusting the ignition point).

The method of operation of the drive system of FIG. 3 is explained below with reference to the flowchart of FIG. 4. In step S1, the control device 11 initially determines whether the internal combustion engine 1 is running in the idle state. In the illustrated example, the following steps of the method are only executed when the engine 1 is idling. In other variants (not shown), however, the electric machine 4 can also serve for active torque fluctuation damping at higher speeds and under load without departing from the scope or spirit of the invention. In the next step S2, the control device 11 measures the temperature of the internal combustion engine 1 by reading an input signal from the temperature sensor 13. In the following step S3, the control device 9 reads the expected values for the amplitude and phase of the torque irregularities or torque fluctuations at the measured temperature from a memory. The memory can be part of the control device 11. The database can optionally contain data representative of a map of one or more curves. The control device 11 then communicates with a power supply control device (not shown) to determine whether, and with what amount, the electric machine 4 should supply power for the vehicle electrical system 9. (Step S4.) In step S5, the control device controls the inverter 7 and, thus, the electric machine 4 with reference to the instantaneous angular position of the driveshaft 2 as measured by the rotation angle sensor 12 and the expected torque fluctuation values developed from the memory, so that the electric machine 4 generates a varying torque of appropriate amplitude essentially in counterphase to the torque fluctuations of the internal combustion engine 1. The varying torque will typically alternate between a driving torque and a braking torque. Depending on the desired generator function, a constant braking torque may be superimposed on this varying torque. An amount of energy which occurs briefly in the braking phases of the alternating torque and which is consumed again in the subsequent drive phases of the varying torque is temporarily stored in the rapid accumulator 7 for about a half-period length (step S6). The constant energy flow originating from the superimposed constant torque, on the other hand, is delivered to the electrical system 9.

At step S7, the control device 11 determines how large the remaining torque fluctuations are despite the presence of the active damping provided by the electric machine 4. If the remaining torque fluctuations surpass a stipulated (i.e., predefined) upper limit, a deviation of the actual torque fluctuation value from the expected value is identified, and the expectation value information stored in the control device 11 and used in step S3 is changed and brought closer to the actual value (e.g., by replacing the expected value(s) with the actual value(s)).

Figure 4:
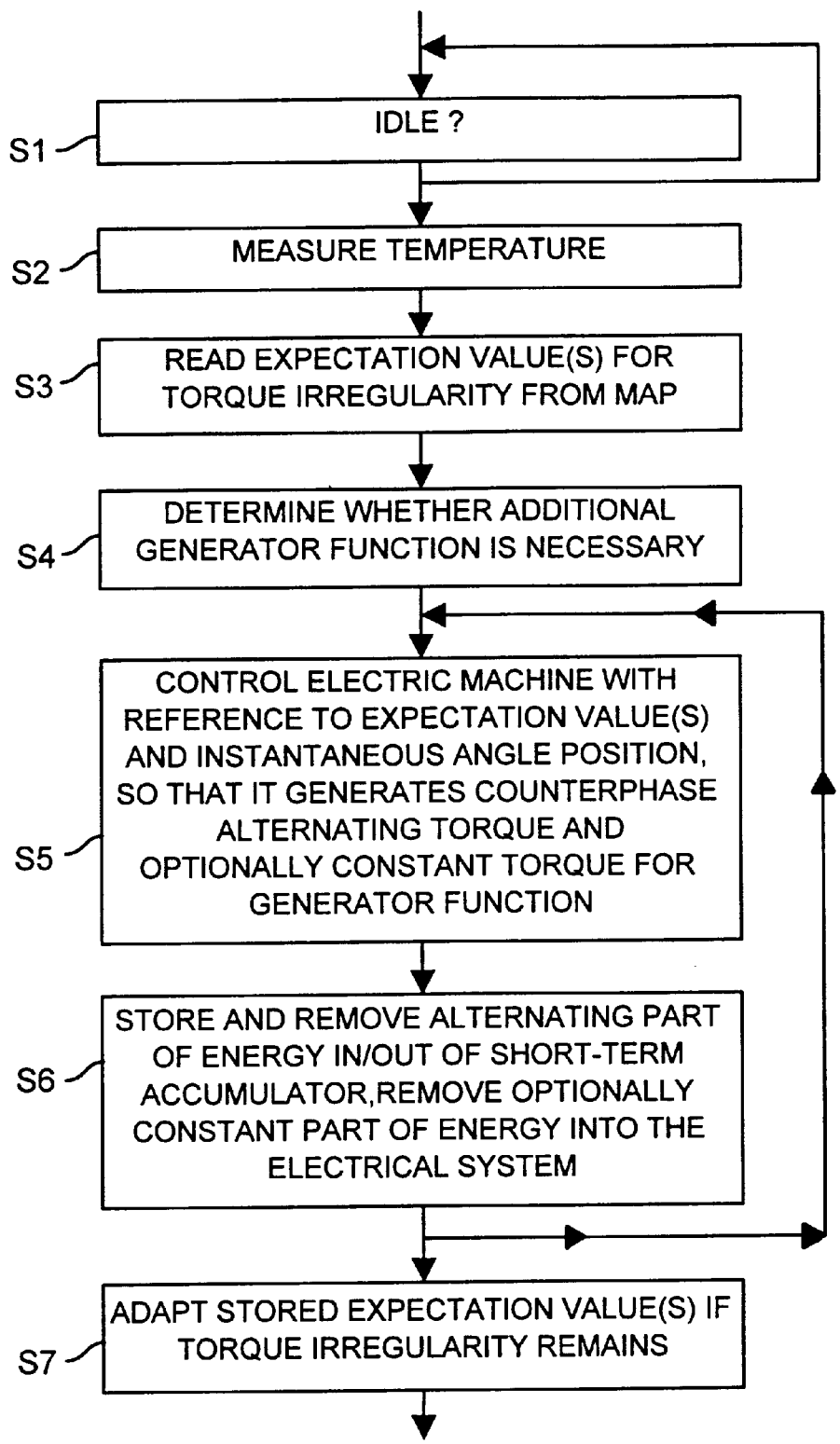
FIG. 4 is a flowchart illustrating an exemplary method of operating the apparatus of FIG. 3.

As shown in FIG. 4, steps S5 and S6 run in succession in continuous repetition. After the initial pass through steps S1 to S4, it is only necessary to re-execute those steps if something changes in the external conditions (for example, the temperature of the internal combustion engine 1, the energy demand of the electrical system 9 or the idling condition). It is sufficient that these steps be used only in response to a change (for example, by an interrupt) or after a predetermined number of executions of steps S5 and S6. The memory adaption (step S7) also need only be carried out periodically. The new expected torque fluctuation values developed in the memory adaptation step S7 can be used to change the permanent values in the memory or can be simply used to change the values currently employed by the controller (i.e., in the latter example, the values in the memory are permanent and are always used as a starting approximation) without departing from the scope or spirit of the invention. Similarly, either the actual deviation values or values derived therefrom can be used to replace the previous expected torque fluctuation value without departing from the scope or spirit of the invention. An appropriately programmed microcontroller, which is part of control device 11, executes the method shown in FIG. 4.

Preferably, the torque fluctuation damping is performed so that the remaining speed fluctuations are the same at all temperatures and correspond to half the undamped value of the speed fluctuations at the operating temperature. Preferably, the control device 11 controls the idling speed to a reduced, temperature-independent value as explained in the example of FIG. 2 (e.g., reduces the average target idling speed used in a control loop to thereby reduce the actual average idling speed).

From the foregoing, persons of ordinary skill in the art will appreciate that apparatus and methods have been disclosed wherein the torque fluctuations experienced by an internal combustion engine are actively damped such that the amplitudes of the fluctuations are substantially the same in a cold engine and in a warm engine. Because of this active damping, it is not necessary to raise the actual average idling speed for a cold engine and, in fact, permits the actual average idling speed to be reduced across all temperatures.

As explained above, to achieve the reduction in the amplitude of the torque fluctuation, the electric machine 4 applies a varying torque, which is similar in time trend to the torque fluctuations of the internal combustion engine 1, but is essentially applied in counterphase to them. It is possible, in principle, to execute the torque-irregularity-reducing function of the electric machine 4 only during cold idle, so that the torque fluctuation amplitude experienced during cold idle is adjusted to that experienced during warm idle. However, in the preferred embodiment, the electric machine 4 also advantageously has a torque-irregularity-reducing effect during warm idling. In this case, the torque-irregularity-reducing effect of the electric machine 4 is greater during cold idle than during warm idle. Stating that the amplitude of the torque changes applied by the electric machine 4 in the cold state is greater than that applied in the warm state encompasses both of the aforementioned possibilities, namely, zero torque adjustment in the warm state and a non-zero torque adjustment in the warm state.

The greater gas forces experienced at low temperature generally lead to both an increase in amplitude of the overall torque fluctuation, and a slight shift in phase angle (since the phases of the gas and inertial forces are different and the percentage of gas forces increases). This phase shift is advantageously allowed for in the disclosed apparatus by not only increasing the amplitude of the countertorque applied by the electric machine 4 at low temperature, but also shifting the phase of the applied countertorque so that the counterphase nature of the countertorque is essentially retained.

Any rotating machine that can generate the required rapid variation of torque can be employed as the electric machine 4. An induction machine is particularly advantageous for this purpose. In contrast to a commutator machine, an induction machine is understood to indicate a commutator-less machine in which the stator 6 generates a magnetic rotating field that revolves around 360° and entrains the rotor 5. The electric machine 4 can be designed, in particular, as an asynchronous machine, (for example, with a squirrel-cage rotor), or as a synchronous machine, (for example, with a rotor with salient magnetic poles). The squirrel-cage rotor in the asynchronous machine can be a squirrel-cage rotor with short-circuit bars in the axial direction. In other embodiments of the asynchronous machine, the rotor 5 has windings that can be externally shorted via slip rings. The salient magnetic poles of the rotor 5 in the synchronous machine are achieved, for example, with permanent magnets or electromagnets that can be fed with an exciter current via slip rings. The torque variation is produced by a corresponding variation of the rotating field. For example, the electric machine 4 is operated as a generator and motor in rapid alternation. The variable currents and voltages required for this alternation can be generated, for example, the inverter 7, which can produce generator and motor operation and switch rapidly between both operating methods.

The electric machine 4 can be indirectly coupled to the internal combustion engine shaft, (for example, via pinions, V-belts, etc.). However, in the preferred embodiment part of the machine 4 (e.g., the rotor) advantageously sits directly on the engine shaft 2 and is optionally coupled to the shaft 2 to rotate in unison therewith. The rotor 5 can sit, for example, on the shaft 2 leading to the transmission, or on the other side of the internal combustion engine 1 on the blind shaft stub. Another machine part (e.g., the stator 6) is connected or releasably connected to a non-rotatable part of the internal combustion engine 1, for example, to the engine or transmission housing.

In addition to its function of idle control, the electric machine 4 can advantageously have one or more additional functions. For example, the machine 4 can operate as an active damper, can act to reduce torque fluctuations even at higher speeds, can operate as a starter for the internal combustion engine 1, can function as a generator for the electrical system, can serve as an additional vehicle drive engine, and/or can operate as an additional vehicle brake.

The disclosed apparatus have distinct advantages relative to ordinary idling speed controls. For example, the absence of an increase in idling speed during cold idling of the engine 1 achieves lower fuel consumption; lower exhaust emission; and lower noise load. The disclosed apparatus and methods, thus, make a contribution to environmental protection and sensible use of scarce resources.

Active reduction of torque fluctuations permits a reduction of the higher cold idling speed to the value of the warm idling speed, and also a reduction of the overall idling speed to a value below the ordinary warm idling speed. The electric machine 4 is advantageously controlled so that the torque fluctuations of the internal combustion engine 1 in cold and warm idle are largely or almost fully compensated. Preferably, the average idling speed in the internal combustion engine 1 is then significantly reduced in the direction of the critical speed while retaining the safety margin ordinarily required in the corresponding internal combustion engine 1. The reduction of the average idling speed relative to the warm idling speed of the same engine 1 when undamped is preferably as much as at least 50%, and more preferably at least 75%, of the speed variation amplitude of the same undamped engine in a warm idling state.

The following numerical example should clarify the foregoing. The critical speed in an internal combustion engine 1 is, for example, 600 rpm and the safety margin is 50 rpm. The speed fluctuation amplitude during warm idling is 100 rpm, and in cold idling is 250 rpm. In the usual prior art case, the average idling speed in the warm state is 750 rpm (namely, the sum of the critical speed, the safety margin and the speed fluctuation amplitude). The instantaneous speed then fluctuates between 650 rpm (the sum of the critical speed and safety margin) and 850 rpm (namely, the sum of the critical speed, safety margin and double the fluctuation amplitude). Also, in the usual prior art case, the average idling speed in the cold state is 900 rpm, and the instantaneous value of the idling speed deviates between 650 rpm and 1150 rpm. In some embodiments represented in FIG. 2, the (now overall (meaning in both warm and cold states)) average idling speed is reduced by half the value of the amplitude of the undamped idling speed variation of the undamped engine in the warm state, (i.e., by 50 rpm to 700 rpm). In the limiting case, the reduction corresponds to the total speed variation amplitude and the reduction is, therefore, 100 rpm and leads to 650 rpm.

As explained below, different operating states of the electric machine 4 are possible. In the simplest case, it has no additional driving or braking function, but serves only to reduce torque fluctuations. For this purpose, it applies an alternating torque and has a driving effect during occurrences of an instantaneous torque value lying below the average internal combustion engine torque and has a braking effect during occurrences of an instantaneous torque value lying above the average torque. The machine 4, therefore, operates as a motor/generator in rapid alternation. Apart from limited losses, the energy amount required during the driving phase equals the amount recovered in the braking phase. The amount of energy pertaining to a driving or braking phase can be temporarily stored in a rapid accumulator 8, (implemented by, for example, a capacitor). The torque fluctuation reduction apparatus is, therefore, a torque smoothing apparatus that consumes no energy, apart from the limited losses.

Persons of ordinary skill in the art will appreciate that other operating methods in which the electric machine additionally applies a constant torque to the varying torque in idle are also advantageous. "Constant" as used in this context includes "relatively slowly variable" (as referenced to the rapid variation of the torque applied for the torque irregularity reduction). The constant torque can be a braking torque and, for example, serve for the already mentioned generator function. By way of another example, the constant torque can be a driving torque in idle control applications where the electric machine 4 applies a driving torque to assist in avoiding a reduction of the average idling speed because of a sudden load engagement of a mechanical consumer.

When the electric machine 4 performs such additional functions (i.e., applies a constant torque) the energy balance of the electric machine 4 is no longer equalized as was the case with pure torque fluctuation reduction. For example, with superimposed constant braking torque, the electric machine 4 delivers more energy in the braking phase than it requires in the subsequent driving phase (this excess energy is intended, for example, to supply the electrical system 9 of the vehicle). Of course, persons of ordinary skill in the art will readily appreciate that, if the amount of superimposed torque is greater than the torque fluctuation amplitude, the torque applied by the electric machine 4 no longer changes sign. It then only has a braking (or driving) effect, in which the braking torque (or the driving torque) varies.

The electric machine 4 can be controlled to reduce torque fluctuations by open loop control, by regulation (closed loop control), and/or by mixed forms of these control types. Open loop control is particularly simple. For example, the anticipated values for amplitude and, optionally, the phase of the torque variations of the internal combustion engine 1 can be stored in a map as a function of the internal combustion engine temperature and, optionally, as a function of the air temperature. After identifying the temperature(s) by one or more appropriate temperature sensors, the corresponding amplitude (and optionally the phase) value(s) are retrieved from the map. The amplitude (and optionally the phase) of the counteracting torque fluctuation of the electric machine 4 is determined from these value(s). The temperature of the internal combustion engine 1 immediately after startup can also be indirectly determined, for example, by measuring the torque required for starting. The starting torque can also be indirectly determined by measuring the electrical power trend required for starting. Naturally, the torque fluctuation to be applied to the electric machine 4 can also be characterized from the outset as a function of the temperature(s). This type of open loop control, however, cannot allow for disturbances that are not included in the map (for example, engine wear).

During pure closed loop control, on the other hand, no temperature measurement is required. Neither is prior knowledge of the dependence of fluctuation amplitude on temperature and other disturbances required. Instead, it is sufficient to measure the current torque fluctuation, (for example, by evaluating the signals of a crankshaft rotational angle sensor 12), and to control the electric machine 4 so that it counteracts the torque fluctuations as a function of the measured value. Since a torque fluctuation of the internal combustion engine I is only expressed as torque fluctuation with a delay (for example, with a phase shift of 0° to 90° during a sinusoidal irregularity), control is generally designed so that a measured speed surpassing or falling short of the average speed only has an effect in a subsequent working cycle in a corresponding oppositely directed intervention of the electric machine 4. Since the torque fluctuations generally have a relatively large time coherence, (i.e., are strongly correlated over several successive cycles), relatively strong torque fluctuation suppression can be achieved with only delayed control intervention.

Mixed forms of open loop control and regulation (closed loop control) are also advantageous. For example, a disturbance-switched regulation is possible in which the temperature signal influences the controller input or output, so that an approximate value for the torque fluctuation to be expected at the occurring temperature already forms the basis of the first intervention of the electric machine 4. The initial control difference is rendered smaller by this approach and can be corrected much more quickly. Another advantageous possibility is adaptive open loop control. In this case, the undesired remaining torque fluctuations during the controlled reduction are determined and, after averaging, are used for a slow adjustment (adaption) of the control values, so that these undesired deviations disappear. In this case, disturbances like wear are considered in the map.

Although certain embodiments of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. For use with a vehicle having an internal combustion engine that exhibits torque fluctuations during idling, the internal combustion engine having a cold temperature state and a warm temperature state, an apparatus comprising:
    at least one electric machine coupled to the internal combustion engine for applying a torque with a varying amplitude to the internal combustion engine to reduce the torque fluctuations, the amplitude of the torque applied to the internal combustion engine by the electric machine being greater when the internal combustion engine is in the cold temperature state than when the internal combustion engine is in the warm temperature state; and
    an idle control system for setting an average target idling speed for the internal combustion engine, wherein the idle control system sets the average target idling speed at a first level when the internal combustion engine is in the warm temperature state and at a second level when the internal combustion engine is in the cold state, the second level being the same or lower than the first level.

2. An apparatus as defined in claim 1 wherein the control system sets an average target idling speed of the internal combustion engine that is closer to a critical speed of the internal combustion engine then could be set in the absence of the varying torque applied by the electric machine.

3. An apparatus as defined in claim 1 wherein the torque applied to the internal combustion engine by the at least one electric machine includes a constant torque component and a varying torque component which is superimposed on the constant torque component.

4. An apparatus as defined in claim 1 wherein the amplitude of the varying torque is selected based on a temperature associated with the internal combustion engine, and the torque adjustment is performed via at least one of closed loop control and open loop control.

5. An apparatus as defined in claim 1 wherein the torque adjustment is performed via closed loop control.

6. An apparatus as defined in claim 1 wherein the average target idling speed set by the idle control system is substantially the same in the cold temperature state and the warm temperature state.

7. A method of controlling the idling speed of an internal combustion engine comprising the steps of:
    measuring a temperature associated with the internal combustion engine;
    reading at least one expected torque fluctuation value associated with the measured temperature from a torque fluctuation database;
    employing the at least one expected torque fluctuation value to control an electric machine coupled to the internal combustion engine to apply a varying torque to the internal combustion engine to thereby reduce torque fluctuations associated with the internal combustion engine; and
    setting a first average target idling speed for the internal combustion engine when the measured temperature indicates that the internal combustion engine is in a warm state; and
    setting a second average target idling speed when the measured temperature indicates that the internal combustion engine is in a cold state, the second average target idling speed being the same or lower than the first average target idling speed.

8. A method as defined in claim 7 wherein the torque fluctuation database is representative of a map.

9. A method as defined in claim 6 further comprising the steps of:
    (a) measuring the torque fluctuation experienced by the internal combustion engine;
    (b) comparing the measured torque fluctuation to a predetermined value;
    (c) if the measured torque value exceeds the predetermined value, determining a new expected torque fluctuation value; and
    (d) employing at least one of the new expected torque fluctuation value and a value derived from the new expected torque fluctuation value instead of the at least one expected torque fluctuation value read from the database to control the electric machine coupled to the internal combustion engine to apply a varying torque to the internal combustion engine to thereby reduce torque fluctuations associated with the internal combustion engine.

10. A method as defined in claim 9 wherein at least the steps (a) and (b) are performed periodically.

11. For use with a vehicle having an internal combustion engine that exhibits torque fluctuations during idling, the internal combustion engine having a drive shaft, a cold state and a warm state, an apparatus comprising:
    a temperature sensor positioned to detect a temperature associated with the internal combustion engine;
    an electric machine operatively coupled to the drive shaft for applying a torque thereto;
    a memory storing a torque fluctuation database associating expected torque fluctuation values with temperatures; and
    a control circuit in communication with the temperature sensor, the electric machine and the memory, the control circuit retrieving an expected torque fluctuation value associated with a measured temperature from the memory and controlling the electric machine to produce a varying torque which is at least initially based on the retrieved expected torque fluctuation value to thereby reduce the torque fluctuations of the internal combustion engine, the control circuit being adapted to set an average target idling speed for the internal combustion engine that is independent of the sensed temperature.

12. An apparatus as defined in claim 11 wherein the control circuit applies a varying torque to the internal combustion engine in both the warm state and the cold state.

13. An apparatus as defined in claim 12 wherein the varying torque applied during the warm state has a smaller amplitude than the varying torque applied during the cold state.

14. An apparatus as defined in claim 11 wherein the control system sets an average target idling speed of the internal combustion engine that is closer to a critical speed of the internal combustion engine then could be set in the absence of the varying torque while maintaining a substantially unchanged safety margin between a critical speed and the lowest expected instantaneous idling speed.

15. An apparatus as defined in claim 11 wherein the control system sets an average target idling speed employing an increased safety margin relative to a safety margin required in the absence of the varying torque.

16. An apparatus as defined in claim 11 wherein the control circuit comprises a microcontroller.

17. An apparatus as defined in claim 11 wherein the control circuit periodically (a) measures the torque fluctuation experienced by the internal combustion engine; (b) compares the measured torque fluctuation to a predetermined value; (c) if the measured torque fluctuation value exceeds the predetermined value, determines a new expected torque fluctuation value; and (d) employs at least one of the new expected torque fluctuation value and a value derived from the new expected torque fluctuation value instead of the expected torque fluctuation value read from the memory to control the electric machine coupled to the internal combustion engine to apply a varying torque to the internal combustion engine to thereby reduce torque fluctuations associated with the internal combustion engine.

18. An apparatus as defined in claim 11 wherein the retrieved expected torque fluctuation value comprises a magnitude value and a phase value.

19. An apparatus as defined in claim 11 further comprising an energy storage device for temporarily storing energy developed by the electric machine when the varying torque acts as a braking torque and for providing energy to the electric machine when the varying torque acts as a driving torque.

20. An apparatus as defined in claim 11 further comprising a rotational position sensor located to sense an angular position of the drive shaft wherein the control circuit receives signals from the rotational position sensor, and the control circuit employs the received signals to apply the varying torque in counterphase to the torque fluctuations of the internal combustion engine.

21. A method of controlling the idling speed of an internal combustion engine comprising the steps of:

controlling an electric machine coupled to the internal combustion engine to apply a varying torque having a first amplitude to the internal combustion engine when the internal combustion engine is in a cold temperature state to thereby reduce torque fluctuations associated with the internal combustion engine;

controlling an electric machine coupled to the internal combustion engine to apply a varying torque having a second amplitude to the internal combustion engine when the internal combustion engine is in a warm temperature state to thereby reduce torque fluctuations associated with the internal combustion engine, the first amplitude being greater than the second amplitude;

setting a first average target idling speed for the internal combustion engine when the internal combustion engine is in a warm state; and setting a second average target idling speed when the internal combustion engine is in a cold state, the second average target idling speed being the same or lower than the first average target idling speed.

* * * * *